Nov. 30, 1948.                 J. H. LEPPERHOFF                    2,455,129
                        APPARATUS FOR COATING THE THREADED
                           PORTION OF BUSHINGS AND NUTS
                                Filed Nov. 22, 1943
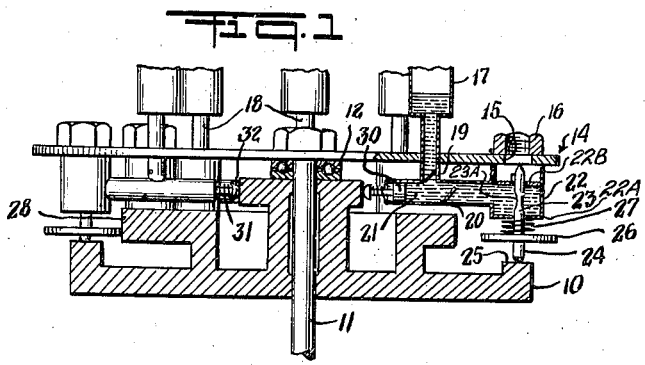
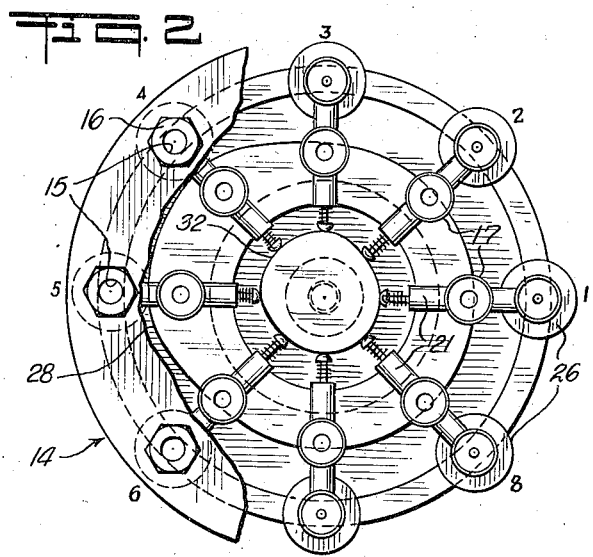
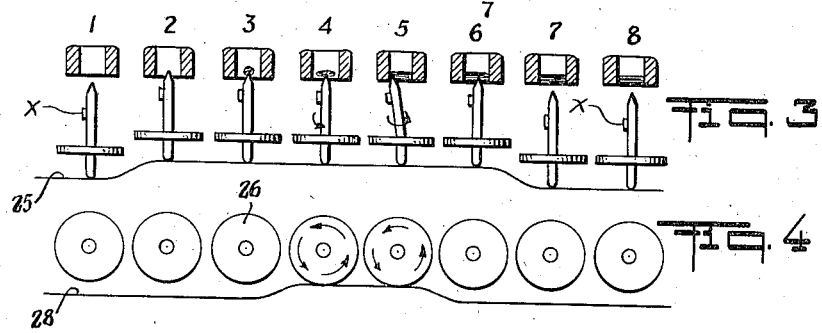
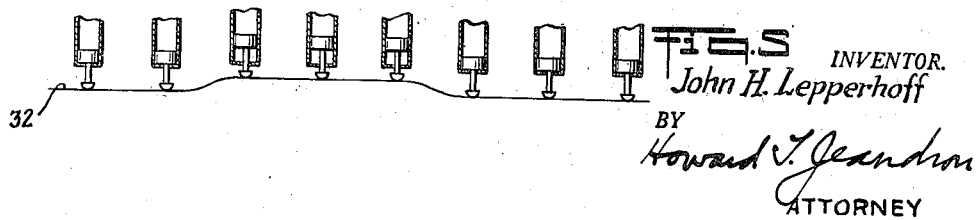
INVENTOR.
John H. Lepperhoff
BY
Howard J. Jeandron
ATTORNEY Patented Nov. 30, 1948

2,455,129

UNITED STATES PATENT OFFICE 2,455,129

APPARATUS FOR COATING THE THREADED PORTION OF BUSHINGS AND NUTS

John H. Lepperhoff, New York, N. Y.

Application November 22, 1943, Serial No. 511,229

3 Claims. (Cl. 91—18)

This invention relates to a machine for coating the threaded surface of nuts or smooth surface of bushing for the purpose of causing a locked connection to be effected when the nut is threaded on to or punched on to a bolt or stud. More specifically, the invention resides in the application of a thin coating of plastic material to the threaded surface of the nut or the smooth inner surface of a bushing which will act as a bond to hold the nut or bushing against releasing after it has been threaded on the bolt or stud inserted.

In carrying out this invention, the preferred form contemplates the use of a coating material of polymerized vinyl resins that is relatively soft as compared with the degree of hardness of the metal used in the nut or bolt. This coating material is applied in such manner as to cover a portion or the entire threaded, grooved or smooth surface with an evenly applied layer of plastic. It has been found that a very thin layer is all that is required to give the desired bonding action; therefore, there is little or no difficulty in threading the nut, due to this layer of coating. It has been found that when a nut has been so treated and threaded on to a bolt or stud, the coating plastic has a tendency to flow away from the point of the greatest pressure and the plastic is pressed into the irregularities or pores of the co-acting metals.

An object of the present invention is to provide a rotary or continuous apparatus which will force enough of the desired plastic material to the internal thread or surface of the nut or bushing and wipe the threads of the nut with this plastic, applying it in an even coating.

Another object of the present invention is to provide a rotary or continuous apparatus which will force enough of the desired plastic material to the face of a nut or bushing, applying it in an even coating.

Further features of the present invention; such as the treatment of the female member of combinations such as snap fasteners, special bushings, etc., will become apparent from the following description of embodiments given by way of example and illustrated in the accompanying drawings, in which Fig. 1 refers to a cross sectional view of the apparatus;

Fig. 2 illustrates a plan view, partly in section, of the apparatus;

Fig. 3 is a schematic illustration of a series operations in the apparatus;

Fig. 4 is a schematic illustration of the method of turning the plastic applying portion of the apparatus;

Fig. 5 is a schematic illustration of the method of pumping a desired amount of plastic to be applied.

In the apparatus shown in Fig. 1 there is provided a stationary casting member 10 with a central drive shaft 11 mounted in a bearing 12. A rotating support member 14 is affixed to the shaft 11. A plurality of openings 15 are provided in the member 14 with means for mounting a plurality of nuts 16 concentrically over the openings provided in the member 14. Also supported by the member 14 is a plurality of fluid-retaining means 17 which connect through the member 14 by means of a pipe 18 with a valve 19 and 20 and a piston-actuated cylinder unit 21. The unit 21 in turn is connected with a cylinder 22 in which a reciprocating ejector applicator 23 is mounted. The applicator 23 has a base portion 24 which rests on a cam 25. The base portion 24 also has a friction drive plate 26 and a spring 27. The plate 26 in operation contacts the cam face 28 which is a part of the casting 10. The piston cylinder 21 has a piston 30 mounted therein which is held in a retracted position by a spring 31 so that the piston rod bears against a cam 32.

In operation, the shaft 11 is driven in either clockwise or counter-clockwise direction and carries the apparatus mounted thereon in similar fashion. During the rotation of this apparatus, the pistons 30 riding on the cam 32 will reciprocate in their respective cylinder 21, pumping the fluid through valve 20 to the cylinder 22, on each of the forward strokes of piston 30, and on the return stroke drawing liquid through the valves 19, while closing the valves 20. In addition the liquid pumped into cylinder 22 will in turn pass through the openings in the element 23 to be ejected at the upper applicator point. It is apparent that the upper portion of ejector 23, that is between its tip and the apertures 23A, must be hollow to permit the fluid pumped to pass therethrough. The reciprocating ejector applicator 23 passes through the walls 22A and 22B of the cylinder 22 and its lower end is held on the cam face 25 by means of the spring 27. The upper end of the ejector will be lifted by this cam action into a central portion within the nut 16, carrying the fluid pumped through its central opening to its ejector point at the tip. The plate 26 attached to or an integral part of the ejector remains stationary until it contacts the face of cam 28 which causes a rotation of the unit 23. Due to the unit 23 being weighted on one side at its upper end, as indicated in Fig. 3, and due to the fact that the upper portion of 23 is flexible, the rotation of 23 will cause this applicator by centrifugal force to bear on the inner periphery of the nut 16.

An enlarged view of the applicator and operating spindle is illustrated in Fig. 3 wherein the applicator 23 is formed with a disc 26 at its base which has as an integral part extending there from an operating spindle 24. In this type of structure it is apparent that the applicator when rotated will, due to the weight X, describe a circle which will be limited in its circumference by the internal periphery of the nut or bushing being coated.

Referring to Figs. 3, 4 and 5, a cycle of the above described operations may be followed.

Fig. 3 illustrates the cam 25 and shows the eight positions illustrated also in Fig. 2. In position 1 the applicator is starting its cycle of operation. In position 2 it has been raised into the nut. In position 3 the fluid is being pumped out of the applicator point. In position 4 the rotation of the applicator is beginning to spread the fluid ejected. In position 5 the applicator is swinging around the periphery of the nut, applying the fluid that has been ejected. In position 6 the rotation has stopped, and the ejector has returned to its central position. In position 7 the applicator is dropped out of the nut. In position 8 it has resumed its normal position, ready to receive another filling of fluid.

Referring to Fig. 4, we may follow the action of cam 28, showing the contact with the plate 26 during positions 4 and 5 of the cycle of operation. Referring to Fig. 5, we may follow the action of cam 32 wherein the fluid is pumped to be injected into the applicator and it will be noted that in positions 1 and 2 the piston is in its normal position, in position 3 it has been forced inward to pump fluid as indicated above, remaining in this position through cycles 4 and 5 and returning to its normal position during positions 6, 7 and 8.

The foregoing description is not intended to limit the present invention which extends to all changes, modifications and equivalents within the scope of the appended claims.

What is claimed is:

1. Apparatus for coating the interior threaded surfaces of a plurality of units with a plastic fluid in a continuous cycle of operation, which includes a rotatable supporting member for said units mounted in a stationary base, a plurality of deflectable tubular wiping elements for applying the plastic fluid within said units rotatably and axially slidably supported by said supporting member, a first cam on said base to move said wiper elements into and out of the units to be coated as said supporting member is rotated, a second cam on said base to rotate said wiping elements when they are within the units to be coated and a third cam on said base to operate a pumping means, a circular drive plate on each wiping element for rotating said wiping elements when said plate is engaged by said second cam as said supporting member is rotated, said pumping means comprising separate reciprocating pumps carried by said supporting member for each of said wiping elements for pumping predetermined quantities of the plastic fluid therethrough when said pumps are operated by said third cam and said wiping elements are within the units, means for deflecting said wiping elements by centrifugal force to apply said plastic fluid to the interior threaded surfaces of said units when said wiping elements are rotated, and means to rotate said supporting member.

2. An apparatus as defined by claim 1, wherein each wiping element comprises a flexible tubular element.

3. An apparatus as defined by claim 1, wherein means is provided for resiliently maintaining one end of each wiping element in contact with said first cam, and said means for deflecting said wiping elements by centrifugal force to apply said plastic fluid to the interior threaded surfaces of the units comprises a weight attached to the upper end of each of said wiping elements.

JOHN H. LEPPERHOFF.

REFERENCES CITED

The following references are of record in the file of this patent:

UNITED STATES PATENTS

| Number | Name | Date |
| --- | --- | --- |
| 1,888,961 | Chappell | Nov. 22, 1932 |
| 2,100,587 | Chalker | Nov. 30, 1937 |
| 2,118,036 | Booty | May 24, 1938 |
| 2,331,824 | Buckingham | Oct. 12, 1943 |
| 2,335,958 | Parker | Dec. 7, 1943 |